United States Patent Office 2,767,127
Patented Oct. 16, 1956

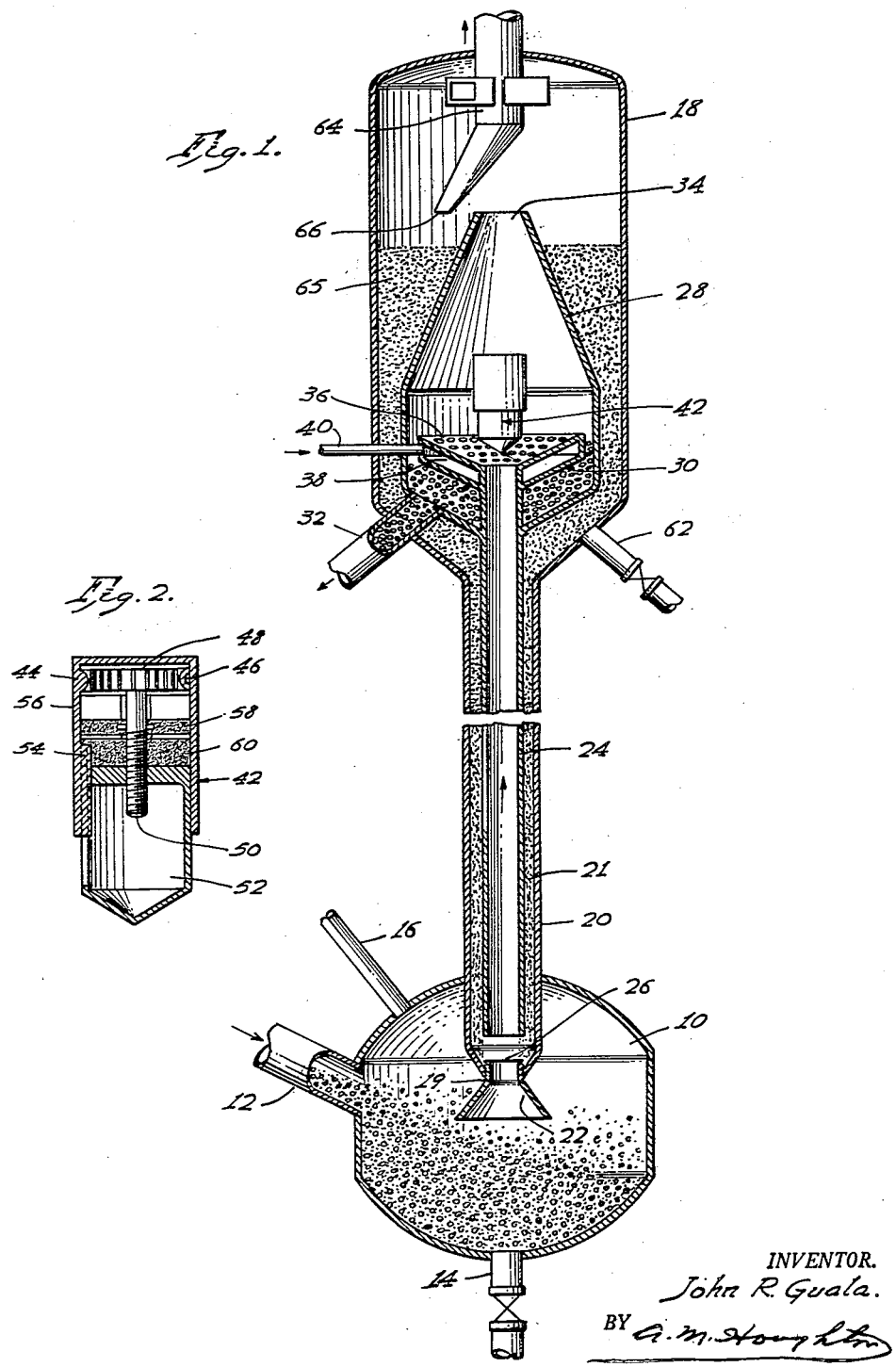

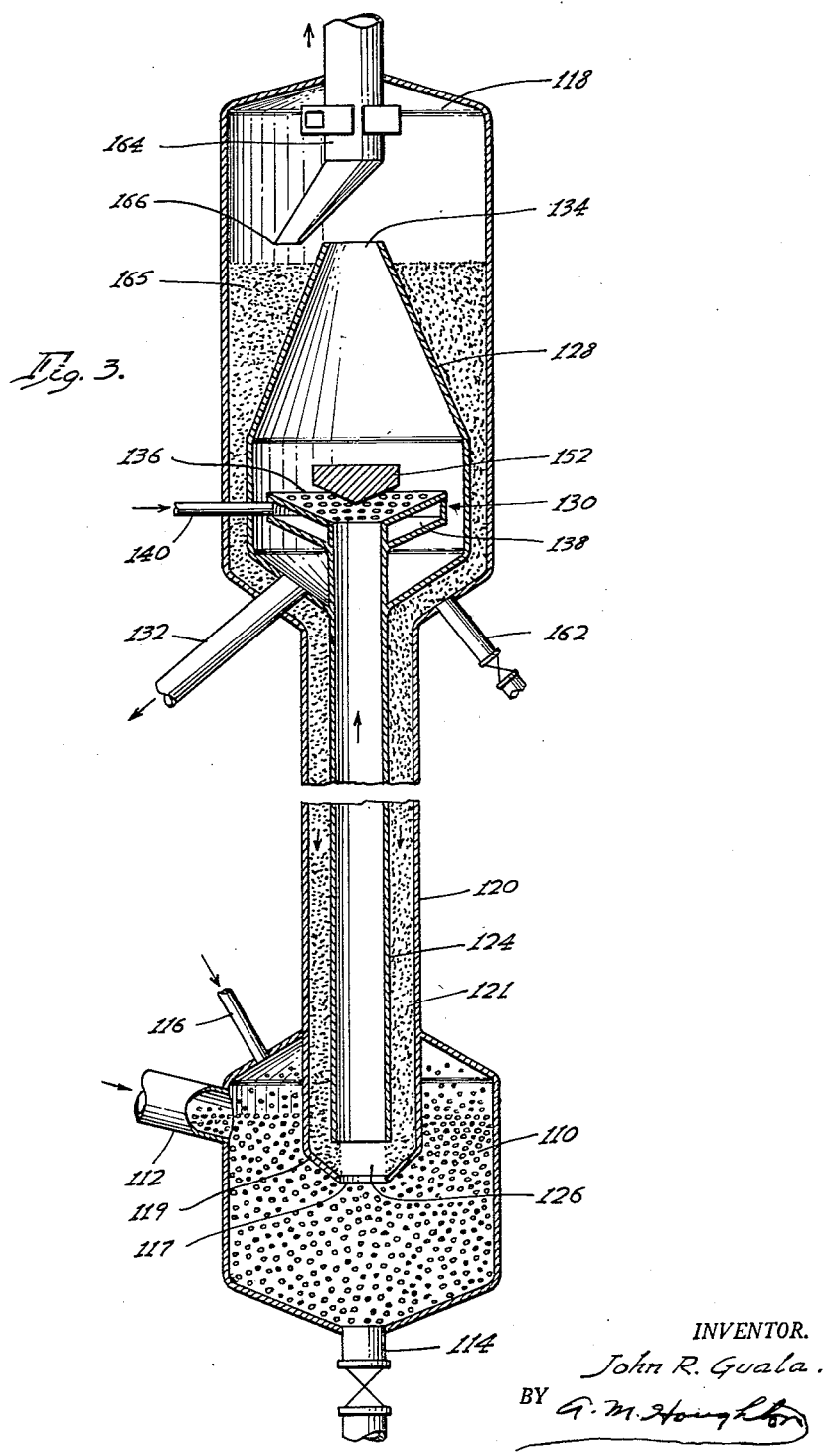

2,767,127

PARTICLE TRANSPORTING METHOD AND APPARATUS FOR USE IN THE CATALYTIC CONVERSION OF HYDROCARBONS

John R. Guala, Bridgeville, Pa., assignor to Gulf Oil Corporation, Pittsburgh, Pa., a corporation of Pennsylvania Application October 30, 1950, Serial No. 192,916

9 Claims. (Cl. 196—52)

This invention relates to a particle transporting method and apparatus, and more particularly to a method and apparatus for upwardly transporting frangible particles.

In recent years there has been an increase in the industrial application of particle handling methods and apparatus. Various systems and apparatus have been developed for transporting and separating particles of variant sizes and wide utilization for these developments has been found.

A serious problem has been encountered in systems wherein frangible coarse particles are upwardly transported by means of gas pressure in that there is a high degree of particle attrition loss during upward transport. Thus, in moving-bed type catalytic processes in which frangible catalyst particles in the form of granules, pellets, or beads are upwardly transported from the bottom to the top of a catalytic system by means of a gas lift, then gravity fed downwardly to a reactor and then to a regenerator, a serious degree of attrition is effected by the abrasive contact of the moving catalyst particles with each other and with the walls of the lift. Not only does the afore-mentioned attrition effect a loss of catalyst, with the concomitant expense of replacing the same, but moreover there is the additional serious problem of adequately collecting and disposing of the resultant catalyst fines.

This invention has as an object the provision of apparatus for upwardly transferring particles of variant size.

A further object of this invention is to provide an apparatus for separating particles of variant size.

Another object is to provide an apparatus which makes beneficial use of the catalyst fines of moving-bed type catalytic processes.

An additional object is the provision of an apparatus for reducing the catalyst attrition in moving-bed type catalytic processes.

Still another object is to provide a method for upwardly transporting and separating particles of variant size.

A still further object is to provide a method for reducing the attrition of frangible coarse particles which are upwardly transported.

A still further object is the provision of a method for reducing the catalyst attrition in moving-bed type catalytic processes.

Other objects will appear hereinafter.

These and other objects are achieved by the present invention which comprises an apparatus for upwardly transporting particles which comprises a conduit, means for introducing coarse particles and gas into the bottom of said conduit under gas pressure, means surrounding the lower end of said conduit for dispersing fine particles into said coarse particles, and means at the upper end of said conduit for separating the coarse from the fine particles.

The process of the present invention comprises a method for upwardly transporting coarse particles under the gas pressure of a motivating gas, which comprises dispersing fine particles among said coarse particles, passing the combined mixture of coarse and fine particles upwardly by means of the gas pressure of the motivating gas through a conduit, and separating the coarse from the fine particles at the top of the conduit.

The present invention is applicable to frangible coarse particles which may be conveniently transported upwardly by means of a gas lift. Examples of such frangible coarse particles include conventional bead, cylindrical and pelleted catalyst particles, such as cracking catalyst particles, which ordinarily range in size from between about 2 to 12 mesh, i. e., from between about 3/8 inch to 1/16 inch. With these sized particles I have found that the addition of fines to the extent of between about 25 to 50 percent by volume of the total volume occupied by the coarse particles when they are at rest is to be preferred, although in many cases smaller volumes will produce advantageous results. As a general rule which may be applied to all sizes of particles for which gas lift procedure is applicable, I have found that the volume of fine particles which should be added should occupy an appreciable portion of the void space volume within the coarse particles such as of the order of between about 1/2 of the total volume of void spaces within the coarse particles to approximately the total volume of void spaces within the coarse particles.

By "fine particles" I mean particles which are appreciably smaller than the coarse particles which are being upwardly transported. In the case of conventional catalyst particles the size of the fine particles will usually be of the order of fines, e. g., particles that will pass through screens having 50 or more openings per linear inch. However, larger sized fine particles may be used, particularly when the size of the coarse particles is appreciable.

Reference should be had to the accompanying drawings which are incorporated into this application and made a part thereof in which:

Fig. 1 is a vertical sectional view of a particle gas lift and separator, especially adapted for the transportation and separation of catalyst particles of variant size, and Fig. 2 is an enlarged vertical sectional view of means for regulating the rate of coarse particle separation 42 shown in Fig. 1.

Fig. 3 is a vertical, sectional view of a modified form of my invention.

Referring now particularly to Figs. 1 and 2, the preferred embodiment of my invention is there illustrated as a particle gas lift and separator comprising a bottom vessel 10 having a particle inlet 12. Bottom vessel 10 is provided with a particle draw-off 14 and a motivating gas inlet 16. Extending substantially vertically downwardly into bottom vessel 10 from upper vessel 18 is an open tubular conduit 20. Conduit 20 tapers inwardly to a smaller cross-sectional diameter at its lower end 19. Concentrically located within conduit 20 is a second tubular conduit member 24 of substantially the same internal diameter as the opening at the base of conduit 20. The lower end of second conduit member 24 terminates near the tapered end portion 19 of conduit 20. Inserted within tapered end portion 19 is regulatory means 22 which comprises a threaded open conic member which may be raised or lowered. By raising or lowering regulatory means 22 the height of the passageway 26 between the terminal end of second conduit member 24 and the open tapered end portion 19 of conduit 20 may be controlled.

The upper portion of second conduit member 24 extends into upper vessel 18. The top section of second conduit member 24 is provided with a hopper means 28 which surrounds the coarse particle separating means 30 for separating coarse from fine particles at the upper end of second conduit member 24. Hopper means 28 is provided with coarse particle draw-off 32 at its base. The uppermost portion of hopper means 28 is open and contains an aperture 34.

Coarse particle separating means 30 comprises a perforated cone 36 beneath which is located a gas chamber 38 and a gas inlet conduit 40. Located within perforated cone 36 is tapered plug means for regulating the rate of coarse particle separation 42, supported by a bracket attached to hopper means 28 (not shown). A detailed drawing of means 42 is shown in Fig. 2 and comprises gas ports 44 and 46 and turbine rotor 48. Turbine rotor 48 is attached to screw 50 which actuates movable tapered plug 52. Key 54 attached to sleeve 56 prevents movable tapered plug 52 from rotating with screw 50, and thus permits tapered plug 52 to move vertically upwardly or downwardly. Screw 50 is lubricated by means of graphite lubricating seals 58 and 60.

Upper vessel 18 is provided with a fine particle draw-off 62. At the top of upper vessel 18 is centrifugal separator 64 whose solid particle outlet 66 lies outside of and below the aperture 34 of hopper means 28. The height of the apparatus will of course vary with the engineering requirements and the size particles used, but in every case must be such that it is sufficiently high so that the pressure head provided by fine particles and gas at the base of the annulus 21 between the outside of second conduit member 24 and the inside of conduit 20 can be made greater than the internal pressure within second conduit member 24.

The operation of this apparatus will be disclosed for a petroleum hydrocarbon catalytic cracking process. However, it is to be understood that this mode of operation is equally applicable to other types of processes employing catalyst particles. In the instant case the catalyst particles comprise frangible silica-alumina cracking catalysts which may be in the form of cylindrical pellets or spheres. These particles are conventionally of the order of about ⅛ inch in diameter and in the case of cylindrical pellets about ⅛ inch in height, and thus may be construed as generally ranging in size from about 2 to 12 mesh. In one form of a commercial cracking process these catalysts are intimately contacted with a petroleum charge at elevated temperatures in a catalytic reactor (not shown). As a result the petroleum hydrocarbon charge is cracked to lower molecular weight products within the reactor, while simultaneously the catalyst particles become coated with carbonaceous contaminants. Due to this carbonaceous coating the catalyst particles suffer a loss of activity and in order to regain their activity are passed downwardly into a catalytic regenerator (not shown). Within the regenerator the carbonaceous contaminants are removed by means of oxidative combustion and the catalytic activity substantially restored to the catalyst particles. Following this, the regenerated catalyst particles are passed into bottom vessel 10 through particle inlet 12. In addition, a minor amount of fresh catalyst may be added prior to the introduction of the catalyst particles into bottom vessel 10. In bottom vessel 10 part of the catalyst particles may be removed through particle draw-off 14 if desired. An inert motivating gas such as flue gas or air is introduced into bottom vessel 10 through gas inlet 16. The motivating gas forces the coarse sized catalyst particles upwardly through the opening in regulatory means 22 into the passage-way 26 between the opening at the base of tapered end portion 19 of conduit 20 and the termination of second conduit member 24.

Prior to entering second conduit member 24 but after passing through regulatory means 22 the catalyst is mixed in passage-way 26 with catalyst fines flowing downwardly in annular space 21. The combined mixture of regenerated coarse sized catalyst and catalyst fines in passage-way 26 passes upwardly through second conduit member 24 with the comparative volume ratio of catalyst fines to regenerated catalyst controlled by the height of passage-way 26 which in turn is dependent upon the position of regulatory means 22. The catalyst fines which are dispersed within the voids between the catalyst particles effectuate an appreciable decrease in the catalyst attrition, inasmuch as they inhibit the lateral motion of the coarse sized catalyst particles and thereby retard the abrasive contact among the various coarse catalyst particles, and between the peripheral coarse catalyst particles and the walls of second conduit member 24. Moreover, the catalyst fines also appear to exert a "cushioning" effect so that even when the catalyst particles come in contact with each other an appreciable reduction in abrasion is effected, and attrition due to catalyst particle disintegration is materially reduced. I have found that for most conventional sized catalyst particles such as those utilized here, the optimum decrease in catalyst attrition can be realized through the addition of catalyst fines to the extent of between about 25 to 50 percent by volume of the total volume occupied by the catalyst particles when they are at rest. However, the addition of smaller amounts of fines will in some cases effectuate a beneficial decrease in catalyst attrition. The optimum size of passage-way 26 is dependent upon the process variables such as the comparative sizes of the catalyst particles and catalyst fines, the size of the apparatus, the physical conditions that are employed, etc.; but in any case it may be readily determined by a few simple routine trials, well within the skill of the operator. The height of the column of catalyst fines and gas within annular space 21 is sufficient to exert a pressure head greater than that within second conduit member 24, and therefore permits the maintenance of a positive seal against the passage of motivating gas through the catalyst fines.

The combined catalyst particles and fines flow upwardly through second conduit member 24 and are deposited in perforated cone 36 of coarse particle separating means 30. A separation of the coarse particles is effected in coarse particle separating means 30 through the addition of an inert gas such as compressed air from gas inlet conduit 40 into chamber 38. This inert gas passes through the perforations in perforated cone 36 at such a rate as to blow the catalyst fines away from the coarse catalyst particles. The coarse catalyst particles substantially free from catalyst fines flow over the rim of perforated cone 36 into hopper means 28. From hopper means 28 the catalyst particles flow by gravity through coarse particle draw-off 32 into the top of a catalytic reactor (not shown). The catalyst particles may then be used for the treatment of additional quantities of petroleum hydrocarbons until they are deactivated after which they may again be regenerated by passing downwardly into the regenerator and the cycle repeated.

The rate of coarse particle flow over the top of perforated cone 36 is controlled by tapered plug means for regulating the rate of coarse particle separation 42 which may be adjusted to meet any specific catalyst particle size and reaction conditions. By moving means 42 downwardly it is seen that the flow of coarse catalyst particles is impeded and as a result a more efficient separation of the coarse particles from the fines may be effected as the depth of the catalyst bed exposed to the action of inert gas from gas inlet conduit 40 is decreased. Contrariwise, the raising of means 42 effectuates a less efficient separation of catalyst fines from the catalyst particles but permits a larger volume of catalyst to be transported and separated. The upward and downward movement of means 42 is effectuated by the passage of inert gas through either port 44 or 46 by any suitable means, not shown. Thus if inert gas is passed through port 44, turbine rotor 48 is actuated which in turn operates screw 50, thus moving plug 52 downwardly. On the other hand if inert gas is introduced into port 46, turbine rotor 48 is spun in the opposite direction with the result that screw 50 moves plug 52 upwardly.

The motivating gas, catalyst fines, and inert gas after having passed through the coarse catalyst deposit in perforated cone 36 pass upwardly through hopper means 28 and aperture 34 into centrifugal separator 64. From the solid particle outlet 66 at the base of centrifugal separator 64 the catalyst fines flow into the outer portion 65 of upper vessel 18 from which they descend through annular space 21 into passage-way 26, after which the cycle is repeated. The build-up of excess catalyst fines is prevented by fine particle draw-off 62.

A modification of my invention in which both the height of the basal passageway between the conduit and second conduit member and the rate of coarse particle separation is fixed, is shown in Fig. 3. In this modification regenerated catalyst particles are passed as before through a catalyst particle inlet 112 into bottom vessel 110. Motivating gas is passed into bottom vessel 110 through motivating gas inlet 116. Excess catalyst may be drawn off from bottom vessel 110 through catalyst draw-off 114.

Catalyst particles enter passage-way 126 by passing through aperture 117 at the base of the tapered end portion 119 of conduit 120. Unlike the preferred form of my invention in which the height of the passage-way between the base of the conduit and the termination of the second conduit member may be regulated, the present modification utilizes a passage-way of fixed height. This height may be determined by the operator through a few trial runs prior to placing the apparatus permanently on stream.

Catalyst fines from annular space 121 join the catalyst particles in passage-way 126 and the combined mixture passes upwardly through second conduit member 124. At the top of second conduit member 124 the combined particles are separated in coarse particle separating means 130. This is effected substantially as before, thus an inert gas such as compressed air enters conduit 140, passes through chamber 138 and then through the catalyst within perforated cone 136. The relative ratio of catalyst particles to catalyst fines is regulated by means of fixed plug 152 set at a given height above perforated cone 136. The coarse catalyst particles substantially free from catalyst fines flow over the rim of perforated cone 136 into the base of hopper means 128, from which they are removed by catalyst draw-off 132.

The catalyst fines, inert gas and motivating gas leave hopper means 128 through aperture 134. The catalyst fines are then separated from these gases in centrifugal separator 164. The fines after leaving the solid particle outlet 166 at the base of centrifugal separator 164 pass downwardly through the outer portion 165 of upper vessel 118 through annular space 121 and join the regenerated catalyst particles in passageway 126. Any excess catalyst fines may be removed by means of catalyst fine draw-off 162. As was explained heretofore with the preferred modification of my invention shown in Figs. 1 and 2 it is essential that the height of the catalyst fines and gas in annular space 121 be sufficient so that the pressure of the catalyst fines at the base surrounding passage-way 126 be greater than the internal pressure within second conduit member 124.

The foregoing embodiments of my invention constitute the preferred forms but it is to be understood that my invention may be varied by one skilled in the art without departing from the scope of the accompanying claims. Thus, for example, other forms of regulatory means for controlling the ratio of incoming catalyst to fines may be utilized and different modifications of my means for regulating the rate of coarse particle separation may be used. A form of means for separating the coarse from fine particles which I have found useful under certain conditions is the so-called "fountain separator," i. e. a separating means which permits the particles to flow freely upwardly and "fountain" over the top of the second conduit member, thereby effecting a gravity separation due to the fact that the denser coarse particles fall downwardly sooner than the fine particles. This type separator does not usually permit as efficient a separation of the coarse from the fine particles as does coarse particle separating means 30 or 130. However, it has the advantages of being simpler and of requiring a lower motivating gas pressure head inasmuch as the resistance offered to the free upward passage of particles with this type separator is but a fraction of that encountered with coarse particle separating means 30 or 130. While I have disclosed the application of my apparatus to the transportation of regenerated catalyst upwardly from a bottom vessel to an upper vessel from which it is transported to a catalytic reactor, it is to be understood that my invention is also applicable to the upward transportation and separation of catalyst particles in other systems. Thus, for example, used catalyst particles might be passed upwardly from an on-stream reactor to a regenerator through the use of my invention. Furthermore, while I have shown the application of my invention to silica-alumina cracking catalyst pellets and beads, it is to be understood that it is equally applicable to other catalyst forms which may be used in other catalytic processes. Examples of such other catalysts include alumina granules or pellets used in reforming processes; pelleted hydrogenation catalysts, such as group VI or group VIII metals or compounds deposited upon carrier bases, used in destructive hydrogenation type reactions; pelleted oxidation catalysts such as vanadium oxide which may be used for the oxidation of various hydrocarbons, etc.

While the preferred application of my invention deals with the upward transportation of frangible substances such as catalysts in which the fine particles are formed from the coarse particles, it is to be understood that my invention of a particle transportation method and apparatus may also be applied to non-frangible coarse particles. When so applied, the fine particles may comprise the same material as the coarse particles, or may comprise a different material.

My invention provides a simple means and method for upwardly transporting particles of variant size. It is of particular value when applied to frangible particles, such as catalyst particles intermixed with catalyst fines in which case it retards the attrition due to the abrasive disintegration of the particles. Moreover, my invention permits a clean separation of the fines from the coarse particles. It is of particular value with moving-bed type catalytic processes in which the catalytic attrition normally encountered may be substantially reduced.

I claim:

1. Apparatus for upwardly transporting coarse particles in a gaseous medium which comprises a bottom vessel, an upper vessel, an open conduit extending downwardly into said bottom vessel from said upper vessel, a second conduit member extending from within the upper vessel located within said conduit, said second conduit member terminating with an open end within said conduit near the lower end of said conduit, particle separating means for separating coarse from fine particles at the upper end of said second conduit member, a hopper means surrounding said particle separating means, a coarse particle draw-off extending from the hopper means out of the apparatus for withdrawing the coarse particles from the apparatus, said hopper means having an outlet opening into the upper vessel for the discharge of fine particles and the gaseous medium into the upper vessel, a fine particle and gas separating means at the top portion of said upper vessel, means for returning the fine particles to said open conduit, and coarse particle and gas inlets in said bottom vessel.

2. Apparatus for upwardly transporting coarse particles in a gaseous medium which comprises a bottom vessel, an upper vessel, an open conduit extending downwardly into said bottom vessel from said upper vessel with the said conduit tapering inwardly to a smaller cross-sectional diameter at its lower end, a second conduit member extending from within the upper vessel located within said conduit, said second conduit member terminating with an open end within said conduit near the tapered lower end of said conduit, a coarse particle separating means at the upper end of said second conduit member, means for regulating the rate of the coarse particle separation, a hopper means surrounding said coarse particle separating means, a coarse particle draw-off extending from the hopper means out of the apparatus for discharging coarse particles from the apparatus, said hopper means having an outlet opening into the upper vessel for delivery of fine particles and the gaseous medium from the hopper means into the upper vessel, a fine particle and gas separating means at the top portion of said upper vessel, means for returning the fine particles to said open conduit, and particle and gas inlets in said bottom vessel.

3. Apparatus for upwardly transporting particles in a gaseous medium which comprises a bottom vessel, an upper vessel, an open conduit extending downwardly into said bottom vessel from said upper vessel with the said conduit tapering inwardly to a smaller cross-sectional diameter at its lower end, a second conduit member extending from within the upper vessel located within said conduit, said second conduit member terminating with an open end within said conduit near the tapered lower end of said conduit, a coarse particle separating means at the upper end of said second conduit member comprising a perforated cone adapted for retaining particles passed upwardly from the second conduit member, a gas chamber below said perforated cone adapted for passing gas through said retained particles, and a tapered plug inserted above the perforated cone; means for regulating the rate of coarse particle separation comprising a controller for varying the distance between the tapered plug and the perforated cone, a hopper means surrounding said coarse particle separating means, a coarse particle draw-off from said hopper means, a fine particle and gas separating means at the top portion of said upper vessel, means for returning the fine particles to said open conduit, and particle and gas inlets in said bottom vessel.

4. Apparatus for upwardly transporting coarse particles in a gaseous medium which comprises a bottom vessel, an upper vessel, an open conduit extending downwardly into said bottom vessel from said upper vessel with the said conduit tapering inwardly to a smaller cross-sectional diameter at its lower end, a second conduit member of substantially the same internal diameter as the opening at the lower end of said conduit extending from within the upper vessel and concentrically located within said conduit, said second conduit member terminating with an open end within said conduit near the tapered lower end of said conduit, means for regulating the height of the passageway between the termination of said second conduit member and the lower end of said conduit, a coarse particle separating means at the upper end of said second conduit member, means for regulating the rate of coarse particle separation, a hopper means surrounding said coarse particle separating means, a coarse particle draw-off extending from the hopper means out of the apparatus for withdrawing the coarse particles from the apparatus, a fine particle and gas separating means at the top portion of said upper vessel, means for returning the fine particles to said open conduit, and particle and gas inlets in said bottom vessel.

5. Apparatus for upwardly transporting particles in a gaseous medium which comprises a bottom vessel, an upper vessel, an open conduit extending substantially vertically downwardly into said bottom vessel from said upper vessel with the said conduit tapering inwardly to a smaller cross sectional diameter at its lower end, a second conduit member of substantially the same internal diameter as the opening at the lower end of said conduit extending from within the upper vessel and concentrically located within said conduit, said second conduit member terminating with an open end within said conduit near the tapered lower end of said conduit, means for regulating the height of the passage-way between the termination of the second conduit member and the lower end of said conduit, a coarse particle separating means at the upper end of said second conduit member comprising a perforated cone adapted to retain particles passed upwardly from the second conduit member, a gas chamber below said perforated cone adapted to pass gas through said retained particles, and a tapered plug inserted above the perforated cone; means for regulating the rate of coarse particle separation comprising a controller for varying the distance between the tapered plug and the perforated cone, a hopper means surrounding said coarse particle separating means, a coarse particle draw-off from said hopper means, a fine particle and gas separating means at the top portion of said upper vessel, means for returning the fine particles to said open conduit, and particle and gas inlets in said bottom vessel.

6. Apparatus for upwardly transporting particles in a gaseous medium which comprises a bottom vessel, particle and gas inlets and a particle draw-off in said bottom vessel, an upper vessel, an open tubular conduit extending substantially vertically downwardly into said bottom vessel from said upper vessel with the said conduit tapering inwardly to a smaller cross-sectional diameter at its lower open end, a second tubular conduit member of substantially the same internal diameter as the opening at the lower end of said conduit extending from within the upper vessel and concentrically located within said conduit, said second conduit member terminating with an open end within said conduit near the tapered lower end of said conduit, means for regulating the height of the passage-way between the termination of said second conduit member and the lower end of said conduit, a coarse particle separating means at the upper end of said second conduit member comprising a perforated cone adapted to retain particles passed upwardly from the second conduit member, a gas chamber below said perforated cone adapted to pass gas through said retained particles, and a tapered plug inserted above the perforated cone; means for regulating the rate of coarse particle separation comprising a controller for varying the distance between the tapered plug and the perforated cone, a hopper means surrounding said coarse particle separating means, a coarse particle draw-off from said hopper means, a fine particle and gas separating means at the top portion of said upper vessel, means for returning the fine particles to said open conduit, and a fine particle draw-off at the lower portion of said upper vessel.

7. A catalytic process which comprises treating hydrocarbons with frangible coarse catalyst particles ranging in size from about 2 to 12 mesh in a reactor, removing deactivated catalyst particles from the reactor and passing them downwardly to a regenerator wherein the catalyst is restored to substantially its original activity, then passing the reactivated catalyst upwardly by means of a gas through a conduit, dispersing catalyst fines in an amount equal to about 25 to 50 percent by volume of the total volume occupied by the catalyst particles when they are at rest among the upwardly moving catalyst particles prior to their entrance into the conduit, separating the catalyst particles from the catalyst fines at the top of said conduit, transferring the catalyst particles to the catalytic reactor, returning catalyst fines to the base of said conduit, forming a gas-catalyst fines seal around the base of said conduit so that the pressure of catalyst fines and gas around the base of the conduit is greater than that within the conduit and therefore prevents the upward flow of catalyst particles except through said conduit, again dispersing a similar volume ratio of catalyst fines among additional catalyst particles, and upwardly passing the combined mixture of catalyst particles and catalyst fines through the conduit by means of gas pressure.

8. A catalytic process which comprises treating hydrocarbons with coarse frangible catalyst particles having a particle size of 2 to 12 mesh in a reactor, removing deactivated catalyst particles from the reactor, passing the deactivated catalyst particles downwardly to a regenerator wherein they are restored to substantially their original activity, removing reactivated catalyst particles from the regenerator, dispersing catalyst fines among the reactivated catalyst particles from the regenerator in an amount equal to approximately 25 to 50 percent of the volume of the catalyst particles when at rest to retard the abrasive disintegration of said reactivated catalyst particles, transporting the mixture of reactivated catalyst particles and catalyst fines upwardly by means of gas pressure through a conduit, separating coarse catalyst particles from catalyst fines at the top of the conduit, transferring the coarse catalyst particles to the catalytic reactor, and returning at least a portion of the catalyst fines to below the base of the conduit for further dispersion among reactivated catalyst particles.

9. Apparatus for upwardly transporting coarse particles in a gaseous medium comprising a bottom vessel, an upper vessel, an open first conduit extending from the upper vessel to the bottom vessel, a separator for the separation of fine and coarse particles suspended within the upper vessel and spaced from the walls of that vessel, a second conduit extending from the separator through the first conduit to the bottom vessel and terminating at its lower end within the first conduit near the lower end thereof, said second conduit having an outer diameter smaller than the inner diameter of the first conduit to form an annular opening surrounding the second conduit extending from the upper vessel to the lower end of the second conduit, said separator having an outlet at its upper end opening into the upper vessel for discharging fine particles and the gaseous medium into the upper vessel wherein fine particles separate from the gaseous medium, a line extending from the separator below the level of the outlet out of the apparatus for removal of coarse particles from the apparatus, means for introducing coarse particles into the bottom vessel, means for introducing the gaseous medium into the bottom vessel, and means for discharging the gaseous medium from the upper vessel.

References Cited in the file of this patent

UNITED STATES PATENTS

| | | |
|---|---|---|
| 2,321,015 | Davis | June 8, 1943 |
| 2,377,512 | Page | June 5, 1945 |
| 2,377,657 | Watts | June 5, 1945 |
| 2,389,701 | Truesdale | Nov. 27, 1945 |
| 2,428,873 | Gunness et al. | Oct. 14, 1947 |
| 2,437,352 | Fragen | Mar. 9, 1948 |
| 2,461,104 | Bates | Feb. 8, 1949 |
| 2,483,485 | Barr | Oct. 4, 1949 |
| 2,515,371 | Jewell | July 18, 1950 |
| 2,546,625 | Bergstrom | Mar. 27, 1951 |
| 2,561,396 | Matheson | July 24, 1951 |
| 2,614,069 | Matheson | Oct. 14, 1952 |

FOREIGN PATENTS

| | | |
|---|---|---|
| 533,037 | Germany | Sept. 8, 1931 |